May 30, 1933.   C. W. RYERSON   1,911,848
TIRE COVER
Filed May 23, 1930

INVENTOR
Creighton W. Ryerson
BY Ira J. Adams
ATTORNEY

Patented May 30, 1933 1,911,848

UNITED STATES PATENT OFFICE

CREIGHTON W. RYERSON, OF JACKSON, MICHIGAN, ASSIGNOR TO RYERSON & HAYNES, INC., A CORPORATION OF MICHIGAN

TIRE COVER

Application filed May 23, 1930. Serial No. 455,009.

This invention relates to covers for objects to be protected from effects of the weather and other deteriorating agencies. More particularly the invention relates to metal covers for spare tires of automobiles.

The usual tire cover in the past has been made of fabric which is easily torn and does not present a neat appearance. To overcome these and other disadvantages I have developed a metal cover for use on spare tires which is strong and durable and which may be painted, enameled or plated to harmonize with the rest of the automobile. My metal cover also may be more readily mounted and dismounted from the spare tire.

Referring to the drawing.

Figure 1:
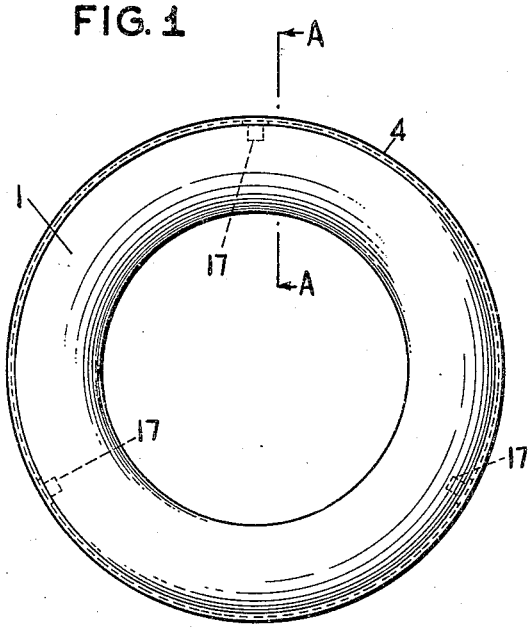
Fig. 1 is a side elevation of the tire cover.

The tire cover may be made in one piece of flexible steel or other appropriate material, which for ease of manufacture it is preferable to form out of a plurality of pieces joined together by lap joints by welding or by some other fastening means. By way of illustration I have shown the tire cover in two sections, section 1 being formed as a ring shaped trough to cover one side of the tire. The inner edge of this section may be bent back on itself as at 2 to make this edge more rigid and to present a more rounded surface to prevent possible injury to the hands of the user in placing the cover on the tire. The other edge 3 of this section 1 is bent over to interlock with the bent over edge 4 of the outer section 5 which may be formed of the same, or other material. The joint between the edges 3 and 4 is shown as being made of the usual lap joint but the two edges may be fastened together in any other desired way without departing from the spirit of the invention.

To permit one to clamp the cover on the tire I serrate section 5 to form strips 6. A wire or other appropriate flexing device 7 may then be secured to these strips in any suitable way. In the drawing I have shown the ends of the strips 6 as being bent over at 8 to receive the wire 7.

The wire 7 may be tightened in any way to flex the strips 8, but for this purpose I have shown a lever 9 having a finger piece 10 and pivoted at 11 to the ear 12 of plate 13 riveted or otherwise secured to the section 5, though the handle may be secured directly to a bent up portion of this section if desired. I have found it an advantage to use a broad enough plate 13 to extend past the free strips 6' and past one or more of the strips 6 or a portion of a strip 6 to reinforce the sheath at this point. Also in some cases the free strips 6' may be held together by a separate wire 7' shown in dotted lines. Also the free strips may be one integral piece instead of being serrated, as shown, and such strips in any case, if desired, may be formed around a smaller diameter so that the wire 7 will be positioned behind the bent over portion though this is not essential and has therefore not been shown in the drawing.

One end of the wire 7 is secured to the handle by passing it through a lug 14 pivoted in the handle. Since tires vary somewhat in diameter means is shown for adjusting the wire which consists of a set screw 15 threaded in the lug 14 and adapted to seat tightly against the wire to hold it in adjusted position.

Figure 3:
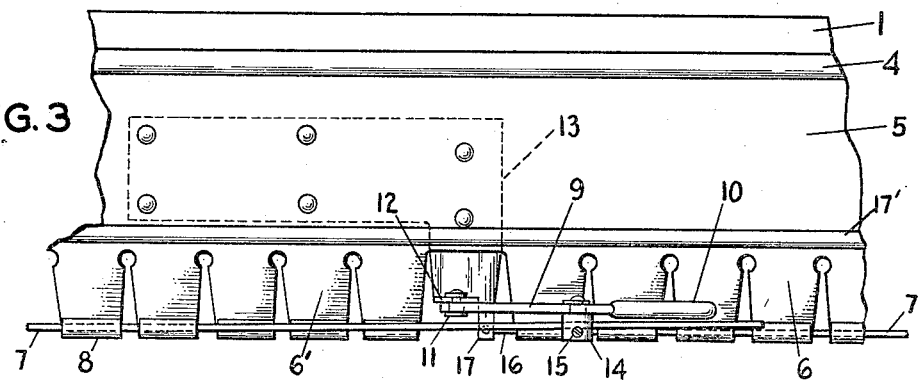
Fig. 3 is a plan view of a portion of the flexible section of the tire cover.
Figure 4:
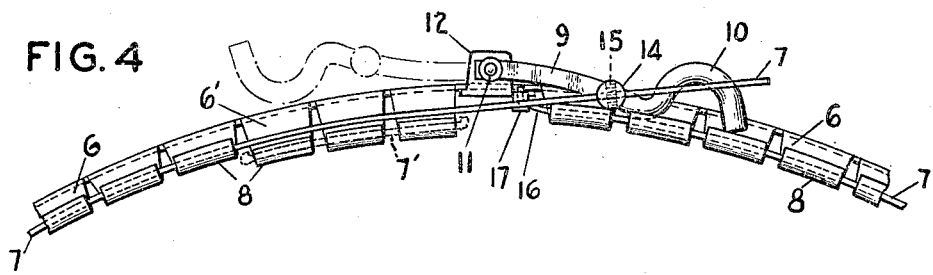
Fig. 4 is an elevation of that part of the cover shown in Fig. 3.

The other end 16 of the wire 7 is secured to an extension 17 of the plate 13 by being bent up through an opening therein, as clearly shown in Figs. 3 and 4. To permit the lever 9 to be thrown to open position the wire 7 may pass above one or more of the sections 6 instead of through the bent over portions 8, as shown in Fig. 4.

To further accommodate the cover to tires of slightly different thickness of tread or slight variation in diameter, I secure spring clips 17 at a plurality of places around the inside of section 5. By way of example, I have shown three of these clips secured to this section spaced 120° apart.

It is preferable to form a bead 17' in the cover to give it additional rigidity.

The construction of the cover having been set forth, the method of applying the cover to an automobile tire will now be described.

Figure 2:
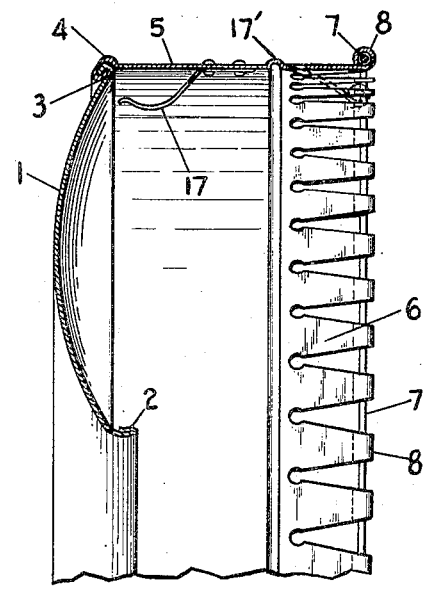
Fig. 2 is a view of the cross section plane of the cover taken on the line A—A of Fig. 1, the cover being in open position.

The tire cover when opened takes the position shown in Fig. 2, as the lever 9 on being thrown back from the position shown in Fig. 4 expands the strips 6 outwardly by pushing on the wire 7. The cover is then slipped in position over the tire and the lever 9 is rotated around the pivot point 11 until it takes the position shown in Fig. 4. This movement of the lever puts tension on the wire 7 and draws the flexible strips 6 down to the position shown in Fig. 4, and as indicated by the dotted line position of the top strip in Fig. 2. During this operation the wire 7 slides through the bent over ends 8. This tightened position of the wire is maintained until the lever 9 is again thrown to the open position since the point of attachment of the wire 7 to the lug 14 is below the pivot point 11 of the handle. When the lever is thrown into this position spring clips 17 will yield and the cover will snugly fit against the tire even though there may be small variations in the tires to which the cover is applied.

If this adjustable feature is not desired the spring clips of course may be omitted.

To remove the cover the lever 9 is rotated in a reverse direction and the wire 7 will expand the flexible strips to the position shown in full lines in Fig. 2 so that the tire cover may be readily removed by drawing it to the left in that figure and off of the tire (not shown).

The metal tire cover may be enameled, painted, or plated to match or harmonize with the cover of the automobile body or the fender, or other part of the automobile, or decorated in any other desired way.

I have described a specific form and shape of tire cover and a particular form of tightening means, but this has been by way of example only, and the invention is not to be limited to these forms, as any other shape of cover or method of tightening the wire may be adopted.

Figure 5:
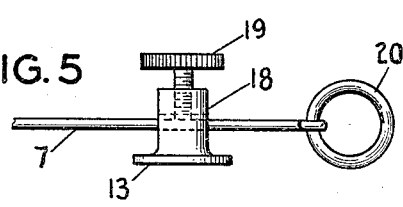
Fig. 5 is a view of a modified form of tightening for the cover.

In Fig. 5 I have shown a modified form of tightening arrangement. In this figure the plate 13 has a lug 18 attached thereto or integral therewith, which lug has a hole through which the wire 7 passes. The free end of this wire 7 is shaped to form or is secured to, a ring 20 which the operator may grasp to place tension on the wire for tightening the cover in position on the tire. When the tightened position is secured the thumb screw 19 which is threaded in the lug may be turned to seat tightly against the wire and hold the adjusted position. Various other adjusting means may be devised for tightening the wire without departing from the spirit of the invention.

As another modification I may construct the serrated portion of spring metal so stamped that the serrations thus take the open position shown in full lines in Fig. 2, and I may use either a wire 7 or a flexible cable or string to draw these serrations in position on the tire. In other words, I may use the resiliency of the serrations to cause them to take the open position instead of forcing them into that position by expansion of the wire.

Having described my invention, what I claim is:

1. In tire covers, a metal sheath adapted to cover one side and the top of a tire and having a serrated portion extending over the said top, the ends of the serrations being bent to form wire seats, a lever pivoted on said sheath, a wire extending through said seats and having one end secured to the sheath and the other end secured to the lever whereby rotation of the lever puts tension on the wire and draws the serrations around the other side of the tire.

2. In spare tire covers, a metal side member adapted to cover one side of a spare tire, a metal band member attached to the peripheral part of the side member, movable fingers spaced around and attached to said band member, means attached to said fingers adapted to extend them outwardly and hold them extended for insertion of a spare tire, said means being adapted to move said fingers inwardly and hold the cover in place on the tire.

3. In spare tire covers, a metal side member adapted to cover one side of a spare tire, a metal band member attached to the peripheral part of the side member, movable fingers spaced around, and attached to, said band members and a flexible draw member secured to the free portion of said fingers to hold them away from the tire while inserting the tire therein and to move them inwardly against the tire to hold the cover in place thereon.

4. In spare tire covers, a metal side member adapted to cover one side of a spare tire, a metal band member attached to the peripheral part of the side member, movable fingers spaced around and attached to, said band member, a pivoted lever, a wire passing through the ends of said fingers and having one end attached to said lever and the other end secured to said band member.

5. In spare tire covers, a metal side member adapted to cover one side of a spare tire, a metal band member attached to the peripheral part of the side member, movable fingers spaced around and attached to said band member, a reinforcing plate attached to said band member, a pivoted lever, an adjusting clamp pivoted to an intermediate part of said lever, a wire having one end fastened to said plate and the other end extending through said clamp, and means on the free ends of said fingers to slidingly surround said wire.

In testimony whereof I have signed my name to this specification this 22nd day of May, 1930.

CREIGHTON W. RYERSON.